(12) United States Patent
Chen

(10) Patent No.: US 10,694,074 B2
(45) Date of Patent: Jun. 23, 2020

(54) INFORMATION PROCESSING METHOD, FIRST TERMINAL, SECOND TERMINAL, AND SERVER

(71) Applicant: Tencent Technology (Shenzhen) Company Limited, Shenzhen (CN)

(72) Inventor: Pinlin Chen, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 173 days.

(21) Appl. No.: 15/952,080

(22) Filed: Apr. 12, 2018

(65) Prior Publication Data

US 2018/0234588 A1    Aug. 16, 2018

Related U.S. Application Data

(63) Continuation-in-part of application No. PCT/CN2016/109083, filed on Dec. 8, 2016.

(30) Foreign Application Priority Data

Jan. 26, 2016  (CN) .......................... 2016 1 0052708

(51) Int. Cl.
*G06F 21/62* (2013.01)
*H04N 1/44* (2006.01)
(Continued)

(52) U.S. Cl.
CPC ....... *H04N 1/4486* (2013.01); *G06F 21/6209* (2013.01); *G06K 9/00255* (2013.01);
(Continued)

(58) Field of Classification Search
CPC ... H04L 9/088; H04L 9/3297; H04L 63/0428; H04L 51/32; G06F 21/10; G06F 21/602;
(Continued)

(56) References Cited

U.S. PATENT DOCUMENTS 8,510,660 B2    8/2013  Morin et al.
9,396,354 B1 *  7/2016  Murphy ............. G06F 21/6245
(Continued)

FOREIGN PATENT DOCUMENTS

CN    101242516 A    8/2008
CN    104040934 A    9/2014
(Continued)

OTHER PUBLICATIONS

Tencent Technology, ISR, PCT/CN2016/109083, Mar. 2, 2017, 2 pgs.

(Continued)

*Primary Examiner* — Minh Dinh
(74) *Attorney, Agent, or Firm* — Morgan, Lewis & Bockius LLP

(57) ABSTRACT

Embodiments of the present disclosure provide an information access control method performed by a computer server, the method including: receiving an image sharing request from a first terminal, the image sharing request including a first image to be shared among a user group of a social networking application; identify one or more faces in the first image through face recognition; randomly selecting one of the faces in the first image; applying a mask to the first image except a predefined portion of the randomly-selected face; sending the partially masked first image to a second terminal; receiving an image viewing request from the second terminal in response to a user selection of the partially masked first image and a user-initiated resource transfer from the second user account to the first user account; and returning a version of the first image not being partially masked to the second terminal.

20 Claims, 19 Drawing Sheets

(51) Int. Cl.
  *H04L 29/08* (2006.01)
  *G06Q 30/02* (2012.01)
  *G06K 9/00* (2006.01)
  *G06Q 50/00* (2012.01)
  *H04W 4/21* (2018.01)
  *G09C 5/00* (2006.01)
  *H04L 9/32* (2006.01)
  *G06Q 20/36* (2012.01)
  *H04L 9/08* (2006.01)
  *H04L 12/58* (2006.01)
  *H04W 4/08* (2009.01)
  *H04W 4/12* (2009.01)

(52) U.S. Cl.
  CPC ....... *G06K 9/00288* (2013.01); *G06Q 20/367* (2013.01); *G06Q 30/02* (2013.01); *G06Q 50/01* (2013.01); *G09C 5/00* (2013.01); *H04L 9/088* (2013.01); *H04L 9/3297* (2013.01); *H04L 51/32* (2013.01); *H04L 67/06* (2013.01); *H04W 4/21* (2018.02); *H04W 4/08* (2013.01); *H04W 4/12* (2013.01)

(58) Field of Classification Search
  CPC .... G06F 21/6209; G06Q 30/02; G06Q 50/01; G06Q 2220/10; G06Q 2220/12; H04W 4/21; H04N 1/448; H04N 1/4486; H04N 1/4493; G09C 5/00
  See application file for complete search history.

(56) References Cited

U.S. PATENT DOCUMENTS

2014/0063240 A1    3/2014  Matthews et al.
2016/0224766 A1*   8/2016  Steelberg ................ G06F 21/10
2017/0337652 A1*  11/2017  Sarin ..................... G06Q 50/265

FOREIGN PATENT DOCUMENTS

| CN | 104052658 A | 9/2014 |
| CN | 104333449 A | 2/2015 |
| CN | 104463011 A | 3/2015 |
| CN | 104484614 A | 4/2015 |
| CN | 104820683 A | 8/2015 |
| CN | 105260676 A | 1/2016 |
| CN | 105681309 A | 6/2016 |
| WO | WO 2008096808 A | 8/2008 |

OTHER PUBLICATIONS

Tencent Technology, Written Opinion, PCT/CN2016/109083, dated Mar. 2, 2017, 7 pgs.
Tencent Technology, IPRP, PCT/CN2016/109083, Jul. 31, 2018, 8 pgs.

* cited by examiner

US 10,694,074 B2

INFORMATION PROCESSING METHOD, FIRST TERMINAL, SECOND TERMINAL, AND SERVER

PRIORITY CLAIM AND RELATED APPLICATION

This application is a continuation-in-part application of PCT/CN2016/109083, entitled "INFORMATION PROCESSING METHOD, FIRST TERMINAL, SECOND TERMINAL, AND SERVER" filed on Dec. 8, 2016, which claims priority to Chinese Patent Application No. 201610052708.0, filed with the State Intellectual Property Office of the People's Republic of China on Jan. 26, 2016, and entitled "INFORMATION PROCESSING METHOD, FIRST TERMINAL, SECOND TERMINAL, AND SERVER", both of which are incorporated herein by reference in their entirety.

FIELD OF THE TECHNOLOGY

The present disclosure relates to communications technologies, and in particular, to an information access control method, a first terminal, a second terminal, a server, and a computer storage medium.

BACKGROUND OF THE DISCLOSURE

As intelligent terminals are widely used, information is exchanged more conveniently by using the intelligent terminals. For example, one information exchange form is exchanging information based on a social application. For example, a user publishes text, image, or video information in a social group based on a social application, and a user receiving the text, image, or video information may comment on the information, thereby implementing information exchange between users in the social group. In addition to comment information generated by comments, information in other forms may further be added. Information in more forms and the initially sent information are integrated to facilitate the information exchange between the users in the social group.

In the initially sent information, a part of the information is expected to be open and displayed to all users. For example, information is an image. The part of the information is displayed on a user interface of the social application in a form of a clear thumbnail or a clear image. Another part of the information is encrypted and is expected to be selectively open and displayed to some users. This part of the information can be clearly displayed on the user interface of the social application only when a user responds to the information and feeds back an information form that can be used for correspondingly decrypting the information. Only a blurred image can be viewed when a user cannot feedback an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. So, how to determine whether it is necessary to return an extra information form of the blurred image? There is not yet an effective solution to the foregoing problem in the related art.

SUMMARY

In view of this, implementations of the present disclosure are intended to provide an information access control method, a first terminal, a second terminal, a server, and a computer storage medium, so as to at least resolve problems in the existing technology.

Technical solutions of the implementations of the present disclosure are implemented as follows:

An implementation of the present disclosure provides an information access control method performed at a computer server having one or more processors and memory storing one or more programs to be executed by the one or more processors, the method comprising:

receiving an image sharing request from a first terminal, wherein the first terminal is associated with a first user account of a social networking application and the image sharing request includes a first image to be shared among a user group of the social networking application of which the first user account is a member;

identify one or more faces in the first image through face recognition;

randomly selecting one of the one or more identified faces in the first image;

applying a mask to the first image except a predefined portion of the randomly-selected face;

sending the partially masked first image to a second terminal, wherein the second terminal is associated with a second user account of the social networking application that is also a member of the user group;

receiving an image viewing request from the second terminal, wherein the image viewing request is generated by the second terminal in response to a user selection of the partially masked first image at the second terminal and a user-initiated resource transfer from the second user account to the first user account; and returning a version of the first image not being partially masked to the second terminal.

An implementation of the present disclosure provides a computer server having one or more processors and memory storing one or more programs that, when executed by the one or more processors, cause the computer server to perform the aforementioned method.

An implementation of the present disclosure provides a non-transitory computer readable storage medium storing a plurality of computer executable operations, wherein the plurality of computer executable operations, when executed by one or more processors of a computer server, cause the computer server to perform the aforementioned method.

The implementations of the present disclosure provide an information access control method. The method includes: selecting a first image on an information sending interface of an application running on a terminal (for example, a first terminal as an image sending party), uploading the first image, and generating a first request according to the first image; sending the first request to a server, to request the server to perform encryption processing on the first image in the first request, so that a second image obtained after the encryption processing is displayed on an information presentation interface of an application running on a second terminal; the second image being a presentation form that is of covering an image layer on an image and that is rendered by means of a masking policy, the presentation form being different from a clear presentation form of another image on the information presentation interface of the application; and receiving payment information returned by the second terminal, the payment information being generated by the second terminal by responding to information on the information presentation interface, and the payment information being used for obtaining, after decryption, a clear presentation form of an image whose image layer has been removed.

According to the implementations of the present disclosure, whether it is necessary to return an extra information form for a blurred image can be accurately determined, thereby avoiding meaningless information interaction, reducing processing costs, improving efficiency, and alleviating congestion in a network environment.

DESCRIPTION OF EMBODIMENTS

The following further describes implementation of the technical solutions in detail with reference to the accompanying drawings.

Figure 1:
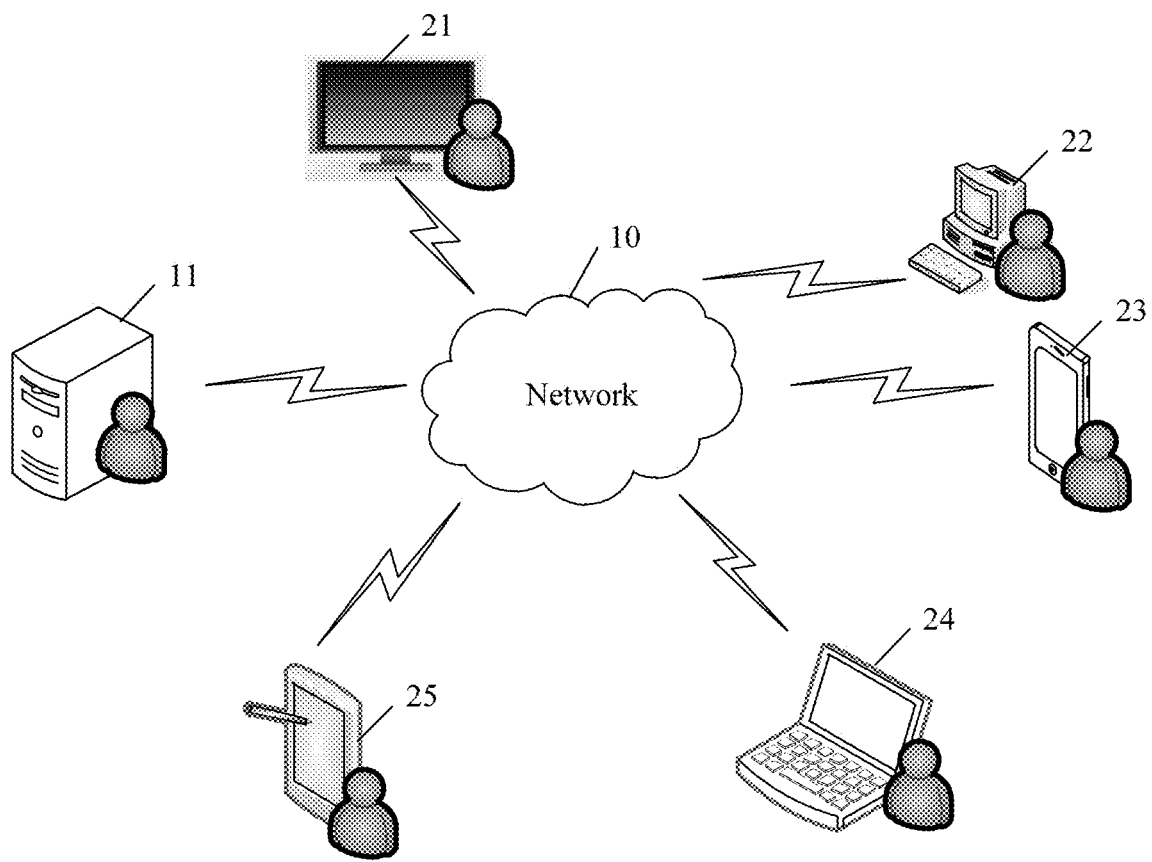
FIG. 1 is a schematic diagram of hardware entities performing information exchange according to an implementation of the present disclosure.

FIG. 1 is a schematic diagram of hardware entities performing information exchange according to an implementation of the present disclosure. FIG. 1 includes one or more servers, terminal devices 21 to 25, and a network 10. The server 11 in FIG. 1 is only an example. The network 10 includes network entities such as a router and a gateway, which are not shown in the figure. The terminal devices 21 to 25 exchange information with the servers by using a wired network or a wireless network. Terminals of the terminal devices 21 to 25 may also exchange information with each other. Each terminal of the terminal devices 21 to 25 may download an application and/or a data packet for updating an application and/or data information or service information related to an application from the server 11. Types of the terminal devices are shown in FIG. 1, including a mobile phone (the terminal 23), a tablet computer or a PDA (the terminal 25), a desk computer (the terminal 22), a PC (the terminal 24), and an all-in-one machine (the terminal 21). Applications such as an application having a social function (for example, a WeChat application), an application having an entertainment function (for example, a video application, an audio playing application, a gaming application, and reading software), and an application having a service function (for example, a map and navigation application) that are required by users are installed in the terminal devices.

Based on the system shown in FIG. 1, for example, exchanged information is image information. According to the implementation of the present disclosure, the terminals of the terminal devices 21 to 25 may be classified into two types, denoted as a first terminal (for example, a terminal corresponding to an image sending party) and a second terminal (for example, a terminal corresponding to an image receiving party) respectively. The first terminal and the second terminal may interact with each other or may exchange information with the servers. On a side of the first terminal, an application runs on the first terminal, a first image on an information sending interface of the application is selected, the first image is uploaded, and a first request is generated according to the first image; the first request is sent to a server, to request the server to perform encryption processing on the first image in the first request, so that a second image obtained after the encryption processing is displayed on an information presentation interface of an application running on a second terminal; the second image is displayed in a presentation form that is of covering an image layer on an image and that is rendered by means of a masking policy, the presentation form being different from a clear presentation form of another image on the information presentation interface of the application; and payment information returned by the second terminal is received, the payment information being generated by the second terminal by responding to information on the information presentation interface, and the payment information being used for obtaining, after decryption, a clear presentation form of an image whose image layer has been removed. On a side of the second terminal, an application runs on the second terminal, at least one image including a second image is displayed on an information presentation interface of the application, the second image being obtained after encryption processing is performed on a first image according to an encryption policy, and the second image is displayed in a presentation form that is of covering an image layer on an image and that is rendered by means of a masking policy, the presentation form being different from a clear presentation form of another image on the information presentation interface of the application; when viewing the image by using an image preview mode, at least one touch operation performed on different regions of the second image is obtained, and local demasking processing is performed according to a preset policy, to obtain at least one piece of key information corresponding to the different regions of the image; a second request is sent to a server when it is determined, according to the at least one piece of key information, that an information form that is used for correspondingly decrypting the second image needs to be returned to the second terminal; second prompt information indicating that the image needs to be viewed by means of a payment behavior is received; a payment behavior generated by responding to the second prompt information is obtained, a third request is generated according to the payment behavior, and the third request is sent to the server, to request to perform decryption processing on the second image; and payment information is generated according to the payment behavior, the second terminal instructing the server to send the payment information to a first terminal.

The example of FIG. 1 is only a system architecture example of the implementations of the present disclosure. The implementations of the present disclosure are not limited to the system structure in FIG. 1. Based on the system architecture, the following implementations of the present disclosure are provided.

Figure 2:
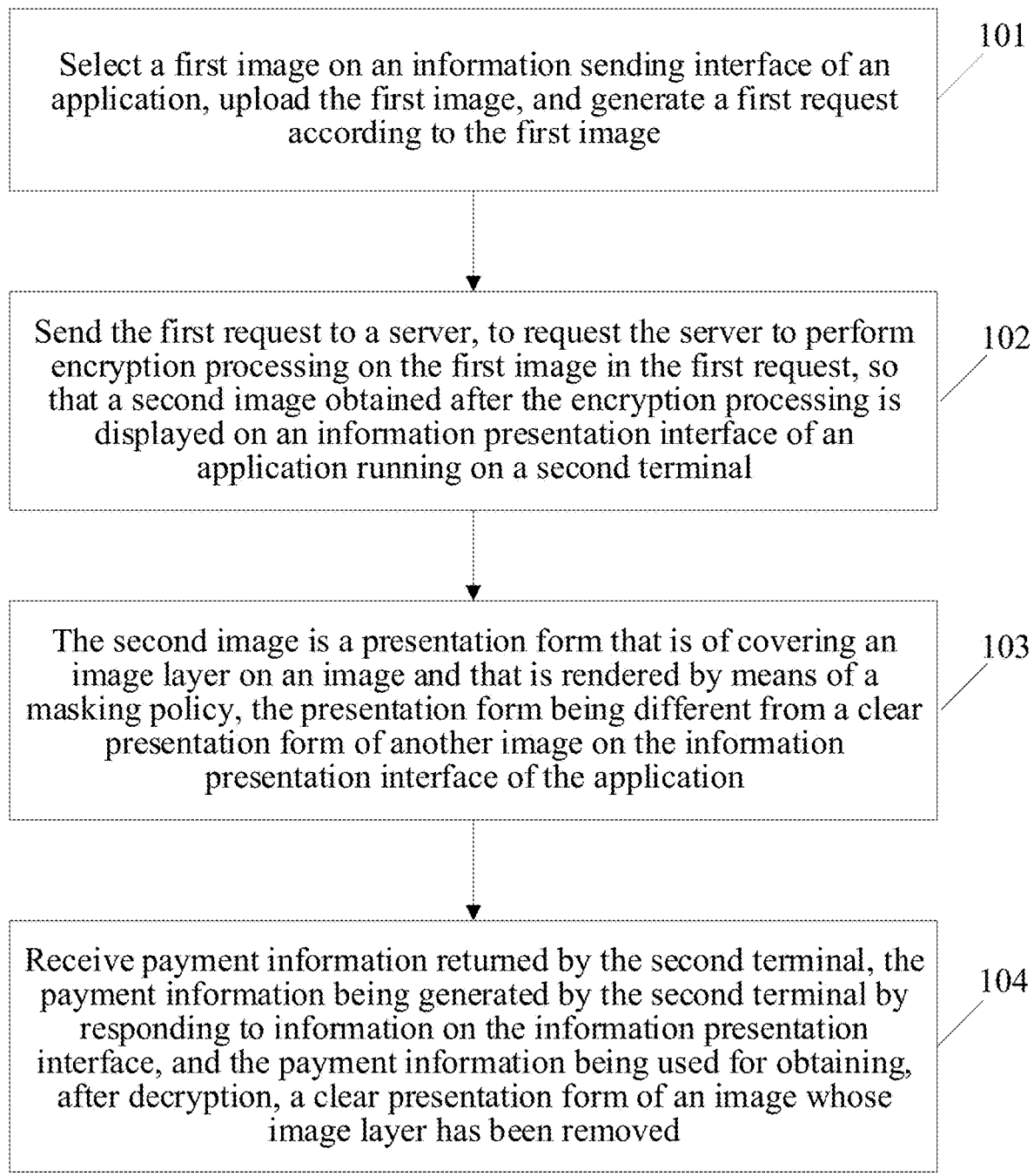
FIG. 2 is a schematic flowchart of an implementation according to some implementations of the present disclosure.

This implementation of the present disclosure provides an information access control method. As shown in FIG. 2, the method is applied to a first terminal (for example, a terminal corresponding to an image sending party), an application runs on the first terminal, and the method includes the following operations:

Operation 101: Select a first image on an information sending interface of the application, upload the first image, and generate a first request according to the first image.

Herein, the first image published by the first terminal is an image that is not encrypted, and a second image is obtained after a server is requested to perform encryption processing in operation 102. The second image is an encrypted image, and is finally presented on an application interface of a second terminal. Nevertheless, not all images published by the first terminal need to be encrypted, and some images may not be encrypted. A specific implementation is: In initially sent information (for example, the first image), a part of the information is expected to be open and displayed to all users. The part (an image that is not encrypted, for example, the first image is directly presented on the application interface of the second terminal) of the information is displayed on a user interface of a social application (for example, a WeChat application) in a form of a clear thumbnail or a clear image. Another part of the information is encrypted (for example, the second image obtained after the first image is encrypted) and is expected to be selectively open and displayed to some users. This part of the information can be clearly displayed on the user interface of the social application only when a user responds to the information and feeds back an information form that can be used for correspondingly decrypting the information. Only a blurred image (the blurred image may be an image undergoing mask adding processing) can be viewed when a user cannot feedback an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. Therefore, corresponding decryption processing is performed on the second image after the following processing described in some implementations. The second terminal determines that an extra information form of the blurred image is necessarily returned; the first terminal obtains the feedback (for example, payment information returned by the second terminal to the first terminal in operation 104); the server, the first terminal, the second terminal exchange information with each other; and the server performs, according to a requirement, encryption processing on the first image that is requested to be published by the first terminal, obtains the encrypted second image, and receives and decrypts a request from the second terminal. In this way, an image layer that is covered on the second image displayed on the application interface of the second terminal and that is initially rendered by means of a masking policy can be removed, thereby viewing an entire image clearly presented on the application interface of the second terminal. It should be noted that before the image layer that is covered on the image and that is rendered by means of the masking policy is removed, a presentation form of the second image on the application interface of the second terminal is an image layer covered presentation form, the presentation form being different from a clear presentation form of another image on the information presentation interface of the application.

Operation 102: Send the first request to a server, to request the server to perform encryption processing on the first image in the first request, so that a second image obtained after the encryption processing is displayed on an information presentation interface of an application running on a second terminal.

Operation 103: The second image is a presentation form that is of covering an image layer on an image and that is rendered by means of a masking policy, the presentation form being different from a clear presentation form of another image on the information presentation interface of the application.

Operation 104: Receive payment information returned by the second terminal, the payment information being generated by the second terminal by responding to information on the information presentation interface, and the payment information being used for obtaining, after decryption, a clear presentation form of an image whose image layer has been removed.

Figure 3:
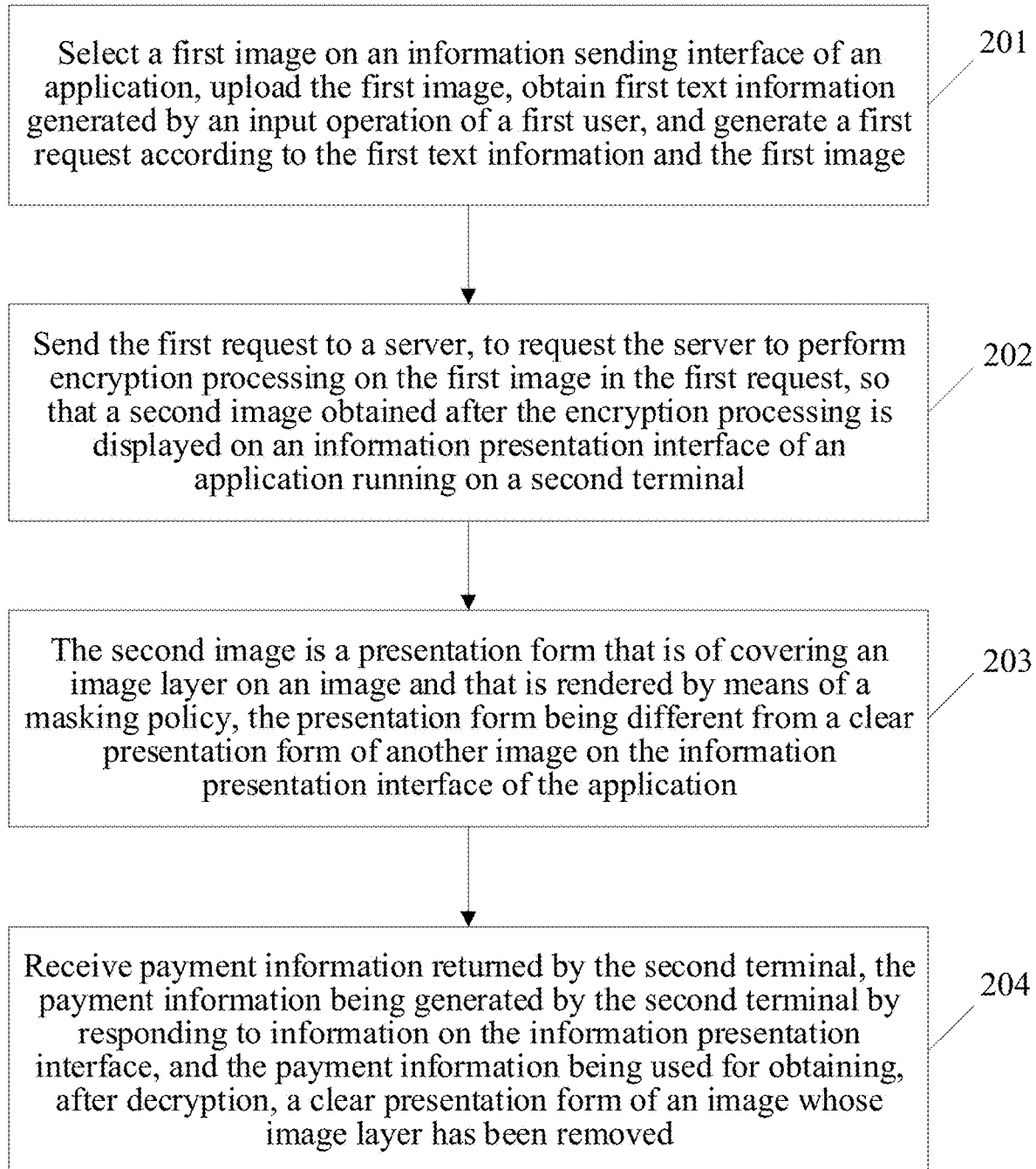
FIG. 3 is a schematic flowchart of an implementation according to some implementations of the present disclosure.

This implementation of the present disclosure provides an information access control method. As shown in FIG. 3, the method is applied to a first terminal (for example, a terminal corresponding to an image sending party), an application runs on the first terminal, and the method includes the following operations:

Operation 201: Select a first image on an information sending interface of the application, upload the first image, obtain first text information generated by an input operation of a first user, and generate the first request according to the first text information and the first image.

Herein, the selecting a first image on an information sending interface of the application includes: obtaining a touch operation at an image collection entry, a presentation form of the image collection entry being rendered in a form different from an existing collection presentation form; and responding to the touch operation to present first prompt information, the first prompt information being used for prompting a first terminal user to select the first image, to request the payment information from a second terminal user; and the first terminal user and the second terminal user belonging to a same social group.

Herein, the first image published by the first terminal is an image that is not encrypted, and a second image is obtained after a server is requested to perform encryption processing in operation 202. The second image is an encrypted image, and is finally presented on an application interface of a second terminal. Nevertheless, not all images published by the first terminal need to be encrypted, and some images may not be encrypted. A specific implementation is: In initially sent information (for example, the first image), a part of the information is expected to be open and displayed to all users. The part (an image that is not encrypted, for example, the first image is directly presented on the application interface of the second terminal) of the information is displayed on a user interface of a social application (for example, a WeChat application) in a form of a clear thumbnail or a clear image. Another part of the information is encrypted (for example, the second image obtained after the first image is encrypted) and is expected to be selectively open and displayed to some users. This part of the information can be clearly displayed on the user interface of the social application only when a user responds to the information and feeds back an information form that can be used for correspondingly decrypting the information. Only a blurred image (the blurred image may be an image undergoing mask adding processing) can be viewed when a user cannot return an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. Therefore, corresponding decryption processing is performed on the second image after the following processing described in some implementations. The second terminal determines that an extra information form of the blurred image is necessarily returned; the first terminal obtains the feedback (for example, payment information returned by the second terminal to the first terminal in operation 204); the server, the first terminal, the second terminal exchange information with each other; and the server performs, according to a requirement, encryption processing on the first image that is requested to be published by the first terminal, obtains the encrypted second image, and receives and decrypts a request from the second terminal. In this way, an image layer that is covered on the second image displayed on the application interface of the second terminal and that is initially rendered by means of a masking policy can be removed, thereby viewing an entire image clearly presented on the application interface of the second terminal. It should be noted that before the image layer that is covered on the image and that is rendered by means of the masking policy is removed, a presentation form of the second image on the application interface of the second terminal is an image layer covered presentation form, the presentation form being different from a clear presentation form of another image on an information presentation interface of the application.

The masking policy includes at least one of the following: blurring processing, direct blackout, and voiding. The blurring processing may be performed by using a ground glass mask.

Operation 202: Send the first request to a server, to request the server to perform encryption processing on the first image in the first request, so that a second image obtained after the encryption processing is displayed on an information presentation interface of an application running on a second terminal.

Operation 203: The second image is a presentation form that is of covering an image layer on an image and that is rendered by means of a masking policy, the presentation form being different from a clear presentation form of another image on the information presentation interface of the application.

Operation 204: Receive payment information returned by the second terminal, the payment information being generated by the second terminal by responding to information on the information presentation interface, and the payment information being used for obtaining, after decryption, a clear presentation form of an image whose image layer has been removed.

This implementation of the present disclosure provides an information access control method. The method is applied to a second terminal (for example, a terminal corresponding to an image receiving party), an application runs on the second terminal, and the method includes the following operations:

Operation 301: A second image obtained after encryption processing is performed on a first image according to an encryption policy exists in at least one image displayed on an information presentation interface of the application, and the second image is a presentation form that is of covering an image layer on an image and that is rendered by means of a masking policy, the presentation form being different from a clear presentation form of another image on the information presentation interface of the application.

Operation 302: Obtain, when viewing the image by using an image preview mode, at least one touch operation performed on different regions of the second image, and perform local demasking processing according to a preset policy, to obtain at least one piece of key information corresponding to the different regions of the image.

Operation 303: Send a second request to a server when it is determined, according to the at least one piece of key information, that an information form that is used for correspondingly decrypting the second image needs to be returned to the second terminal.

Operation 304: Receive second prompt information indicating that the image needs to be viewed by means of a payment behavior.

Operation 305: Obtain a payment behavior generated by responding to the second prompt information, generate a third request according to the payment behavior, and send the third request to the server, to request to perform decryption processing on the second image.

Operation 306: Generate payment information according to the payment behavior, the second terminal instructing the server to send the payment information to a first terminal.

In an implementation of the present disclosure, the performing local demasking processing according to a preset policy, to obtain at least one piece of key information corresponding to the different regions of the image includes: locking, based on a face recognition interface configuration, a face in the image and a region that is near the face and from which a distance to the face satisfies a first threshold, and using a region including the face and the region near the face as a distribution region of the key information; configuring a key information display policy, responding to each touch operation in the distribution region, and randomly displaying one piece of the key information according to the display policy; and the key information being a local clear presentation form obtained by removing a part of an image layer from a part of information in the image, to ensure that not all key information in content of the image is displayed at a time.

Herein, the randomly displaying one piece of the key information according to the display policy at least includes any one or a combination of the following policies:

(1) When there is no face in the image or a quantity of faces in the image is greater than or equal to 5, the key information is randomly displayed according to the display policy.

(2) When there is a face in the image or a quantity of faces in the image is less than or equal to 5, a face is first selected randomly, a region M accounting for 60% of a lower part of the face is circled; a probability of displaying the region M is 10%, a probability of displaying a circumstance of the face is 40%, and a probability of displaying content of the image is 50%.

(3) The display region is a circle, and a minimum radius and a maximum radius are controlled.

In an implementation of the present disclosure, the method further includes: receiving the second image and a decryption key that is corresponding to the encryption policy; decrypting, by the second terminal, the second image according to the decryption key, to obtain the requested first image; and the first image presented on the information presentation interface of the application being a clear presentation form of an entire image obtained after an entire image layer covered on the image is removed through deblurring processing.

In an implementation of the present disclosure, the method further includes: receiving the first image, the first image being a first image obtained after the server decrypts the second image by using a decryption key corresponding to the encryption policy, the first image presented on the information presentation interface of the application being a clear presentation form of an entire image obtained after an entire image layer covered on the image is removed after deblurring processing.

In an implementation of the present disclosure, the method further includes: receiving third prompt information indicating that the image is viewed by means of a payment-free behavior by random default; and obtaining a payment-free behavior generated by responding to the third prompt information, generating a fourth request according to the payment-free behavior, and sending the fourth request to the server, to request to perform decryption processing on the second image.

In an implementation of the present disclosure, the method further includes: receiving the second image and a decryption key that is corresponding to the encryption policy; decrypting, by the second terminal, the second image according to the decryption key, to obtain the requested first image; and the first image presented on the information presentation interface of the application being a clear presentation form of an entire image obtained after an entire image layer covered on the image is removed after demasking processing.

In an implementation of the present disclosure, the method further includes: receiving the first image, the first image being a first image obtained after the server decrypts the second image by using a decryption key corresponding to the encryption policy, the first image presented on the information presentation interface of the application being a clear presentation form of an entire image obtained after an entire image layer covered on the image is removed after demasking processing.

In an implementation of the present disclosure, a first terminal user corresponding to the first terminal and a second terminal user corresponding to the second terminal belong to a same social group.

This implementation of the present disclosure provides an information access control method. The method is applied to a server, and the method includes the following operations:

Operation 401: Receive a first request sent by a first terminal, parse out a first image from the first request, perform encryption processing on the first image according to an encryption policy, and save a second image obtained after the encryption processing.

Operation 402: Receive a second request sent by a second terminal, determine, according to the second request, whether the requested first image is an encrypted image, and if the first image is an encrypted image, return, to the second terminal, second prompt information indicating that the image needs to be viewed by means of a payment behavior, for example, a prompt indicating that a user can view the original image only by means of cash payment or virtual currency payment.

Operation 403: Receive a third request sent by the second terminal, the third request being generated by means of the payment behavior.

Operation 404: Send the second image and a decryption key that is corresponding to the encryption policy to the second terminal, so that the second terminal decrypts the second image according to the decryption key, to obtain the requested first image; or decrypt the second image by using a decryption key corresponding to the encryption policy, to obtain the first image, and send the first image to the second terminal.

Operation 405: The first image is a clear presentation form of an entire image obtained after an entire image layer covered on the image is removed after demasking processing.

In an implementation of the present disclosure, the method further includes: sending, to the second terminal, third prompt information indicating that the image is viewed by means of a payment-free behavior by random default, for example, a prompt indicating that a user can view the original image only by means of cash payment or virtual currency payment, which may be a prompt indicating that the original image is viewed for free after a lottery is won.

In an implementation of the present disclosure, the method further includes:

Operation 501: Receive a fourth request sent by the second terminal, the fourth request being generated by means of a payment-free behavior by random default.

Operation 502: Send the second image and the decryption key that is corresponding to the encryption policy to the second terminal, so that the second terminal decrypts the second image according to the decryption key, to obtain the requested first image; or decrypt the second image by using the decryption key corresponding to the encryption policy, to obtain the first image, and send the first image to the second terminal.

Operation 503: The first image is a clear presentation form of an entire image obtained after an entire image layer covered on the image is removed after demasking processing.

Figure 4:
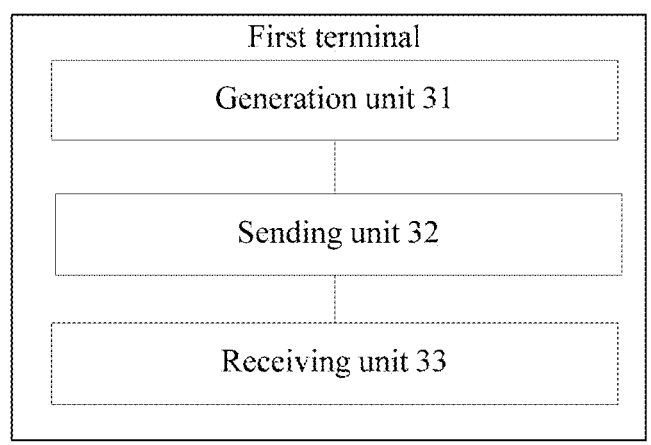
FIG. 4 is a schematic structural diagram of a composition according to some implementations of the present disclosure.

This implementation of the present disclosure provides a first terminal. As shown in FIG. 4, an application runs on the first terminal, and the first terminal includes: a generation unit 31, configured to: select a first image on an information sending interface of the application, upload the first image, and generate a first request according to the first image; a sending unit 32, configured to: send the first request to a server, to request the server to perform encryption processing on the first image in the first request, so that a second image obtained after the encryption processing is displayed on an information presentation interface of an application running on a second terminal; and the second image is a presentation form that is of covering an image layer on an image and that is rendered by means of a masking policy, the presentation form being different from a clear presentation form of another image on the information presentation interface of the application; and a receiving unit 33, configured to receive payment information returned by the second terminal, the payment information being generated by the second terminal by responding to information on the information presentation interface, and the payment information being used for obtaining, after decryption, a clear presentation form of an image whose image layer has been removed.

In an actual application of this implementation of the present disclosure, the first image published by the first terminal is an image that is not encrypted. The first terminal requests the server to perform encryption processing to obtain the second image. The second image is an encrypted image, and is finally presented on the application interface of the second terminal. However, not all images published by the first terminal need to be encrypted, and some images may not be encrypted. A specific implementation is: In initially sent information (for example, the first image), a part of the information is expected to be open and displayed to all users. The part (an image that is not encrypted, for example, the first image is directly presented on the application interface of the second terminal) of the information is displayed on a user interface of a social application (for example, a WeChat application) in a form of a clear thumbnail or a clear image. Another part of the information is encrypted (for example, the second image obtained after the first image is encrypted) and is expected to be selectively open and displayed to some users. This part of the information can be clearly displayed on the user interface of the social application only when a user responds to the information and feeds back an information form that can be used for correspondingly decrypting the information. Only a blurred image (the blurred image may be an image undergoing mask adding processing) can be viewed when a user cannot feedback an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. Therefore, corresponding decryption processing is performed on the second image after the following processing described in some implementation. The second terminal determines that an extra information form of the blurred image is necessarily returned; the first terminal obtains the feedback (for example, payment information returned by the second terminal to the first terminal); the server, the first terminal, the second terminal exchange information with each other; and the server performs, according to a requirement, encryption processing on the first image that is requested to be published by the first terminal, obtains the encrypted second image, and receives and decrypts a request from the second terminal. In this way, an image layer that is covered on the second image displayed on the application interface of the second terminal and that is initially rendered by means of a masking policy can be removed, thereby viewing an entire image clearly presented on the application interface of the second terminal. It should be noted that before the image layer that is covered on the image and that is rendered by means of the masking policy is removed, a presentation form of the second image on the application interface of the second terminal is an image layer covered presentation form, the presentation form being different from a clear presentation form of another image on an information presentation interface of the application.

In some implementations, the server receives an image sharing request from a first terminal. The first terminal is associated with a first user account of a social networking application (e.g., WeChat) and the image sharing request includes a first image to be shared among a user group of the social networking application of which the first user account is a member. Upon receipt of the image sharing request, the server identifies one or more faces in the first image through face recognition. In order to present some key information to a viewer of the first image, the server randomly selects one of the one or more identified faces in the first image and applies a mask to the first image except a predefined portion of the randomly-selected face. The server then sends the partially masked first image to a second terminal. The second terminal is associated with a second user account of the social networking application that is also a member of the user group. Next, the server receives an image viewing request from the second terminal. The image viewing request is generated by the second terminal in response to a user selection of the partially masked first image at the second terminal and a user-initiated resource transfer from the second user account to the first user account. In response to the image viewing request, the server returns a version of the first image not being partially masked to the second terminal.

In some implementations, the server encrypts the first image using an encryption key to obtain a second image that is an encrypted version of the first image and returns the second image and a decryption key to the second terminal. The second terminal is configured to restore the first image from the second image using the decryption key. In some implementations, the restored first image is only displayed on the second terminal for a limited amount of time. For example, the restored first image has an associated expiration timestamp after which the restored first image is replaced by the partially masked first image at the second terminal. The expiration timestamp of the restored first image is dependent upon the user-initiated resource transfer from the second user account to the first user account. For example, the more payment the second user account pays to the first user account, the longer the restored first image is displayed on the second terminal.

In some implementations, as noted above, the server defines a distribution region of the first image including the randomly-selected face and a neighboring region that is within a predefined distance from the randomly-selected face and generate a low-resolution preview version of the first image not including the distribution region as the partially masked first image. In order to get more attention from the user of the second terminal, the server includes, in the distribution region of the first image, a randomly-selected portion of the first image outside the one or more identified faces in the first image. In some implementations, the randomly-selected portion is dynamically updated on the second terminal according to a predefined schedule to depict more information of the first image.

In an implementation of the present disclosure, the first terminal further includes:

an information obtaining unit, configured to obtain, after the selecting a first image on an information sending interface of the application, first text information generated by an input operation of a first user; and the generation unit is further configured to generate the first request according to the first text information and the first image.

In an implementation of the present disclosure, the generation unit includes:

an obtaining subunit, configured to obtain a touch operation at an image collection entry, a presentation form of the image collection entry being rendered in a form different from an existing collection presentation form; and a response subunit, configured to respond to the touch operation to present first prompt information, the first prompt information being used for prompting a first terminal user to select the first image, to request the payment information from a second terminal use, and the first terminal user and the second terminal user belonging to a same social group.

This implementation of the present disclosure provides a second terminal. An application runs on the second terminal, and the second terminal includes: an information display unit, configured to: a second image obtained after encryption processing is performed on a first image according to an encryption policy exists in at least one image displayed on an information presentation interface of the application, and the second image is a presentation form that is of covering an image layer on an image and that is rendered by means of a masking policy, the presentation form being different from a clear presentation form of another image on the information presentation interface of the application; a demasking processing unit, configured to: obtain, when viewing the image by using an image preview mode, at least one touch operation performed on different regions of the second image, and perform local demasking processing according to a preset policy, to obtain at least one piece of key information corresponding to the different regions of the image; a first request sending unit, configured to send a second request to a server when it is determined, according to the at least one piece of key information, that an information form that is used for correspondingly decrypting the second image needs to be returned to the second terminal; an information receiving unit, configured to receive second prompt information indicating that the image needs to be viewed by means of a payment behavior; a second request sending unit, configured to: obtain a payment behavior generated by responding to the second prompt information, generate a third request according to the payment behavior, and send the third request to the server, to request to perform decryption processing on the second image; and a notification unit, configured to generate payment information according to the payment behavior, the second terminal instructing the server to send the payment information to a first terminal.

In an implementation of the present disclosure, the demasking processing unit is further configured to:

lock, based on a face recognition interface configuration, a face in the image and a region that is near the face and from which a distance to the face satisfies a first threshold, and use a region including the face and the region near the face as a distribution region of the key information;

configure a key information display policy, responding to each touch operation in the distribution region, and randomly display one piece of the key information according to the display policy; and the key information is a local clear presentation form obtained by removing a part of an image layer from a part of information in the image, to ensure that not all key information in content of the image is displayed at a time.

In an implementation of the present disclosure, the second terminal further includes:

a first receiving unit, configured to receive the second image and a decryption key that is corresponding to the encryption policy; and a second decryption unit, configured to: decrypt the second image according to the decryption key, to obtain the requested first image; or receive the first image, the first image being a first image obtained after the server decrypts the second image by using a decryption key corresponding to the encryption policy; and the information display unit is further configured to: the first image presented on the information presentation interface of the application is a clear presentation form of an entire image obtained after an entire image layer covered on the image is removed after demasking processing.

In an implementation of the present disclosure, the terminal further includes:

a second receiving unit, configured to: receive third prompt information indicating that the image is viewed by means of a payment-free behavior by random default; and obtain a payment-free behavior generated by responding to the third prompt information, generate a fourth request according to the payment-free behavior, and send the fourth request to the server, to request to perform decryption processing on the second image.

In an implementation of the present disclosure, the second terminal further includes:

a third receiving unit, configured to receive the second image and a decryption key that is corresponding to the encryption policy; and a second decryption unit, configured to: decrypt the second image according to the decryption key, to obtain the requested first image; or receive the first image, the first image being a first image obtained after the server decrypts the second image by using a decryption key corresponding to the encryption policy; and the information display unit is further configured to: the first image presented on the information presentation interface of the application is a clear presentation form of an entire image obtained after an entire image layer covered on the image is removed after demasking processing.

In an implementation of the present disclosure, a first terminal user corresponding to the first terminal and a second terminal user corresponding to the second terminal belong to a same social group.

This implementation of the present disclosure provides a server. The server includes: an address receiving unit, configured to: receive a first request sent by a first terminal, parse out a first image from the first request, perform encryption processing on the first image according to an encryption policy, and save a second image obtained after the encryption processing; an address encryption unit, configured to: receive a second request sent by a second terminal, determine, according to the second request, whether the requested first image is an encrypted image, and if the first image is an encrypted image, return, to the second terminal, second prompt information indicating that the image needs to be viewed by means of a payment behavior; a first request receiving unit, configured to receive a third request sent by the second terminal, the third request being generated by means of the payment behavior; and a first sending unit, configured to send the second image and a decryption key that is corresponding to the encryption policy to the second terminal, so that the second terminal decrypts the second image according to the decryption key, to obtain the requested first image; or a decryption unit, configured to: decrypt the second image by using a decryption key corresponding to the encryption policy, to obtain the first image, and send the first image to the second terminal; and the first image is a clear presentation form of an entire image obtained after an entire image layer covered on the image is removed after demasking processing.

In an implementation of the present disclosure, the server further includes:

a second sending unit, configured to send, to the second terminal, third prompt information indicating that the image is viewed by means of a payment-free behavior by random default.

In an implementation of the present disclosure, the server further includes:

a second request receiving unit, configured to receive a fourth request sent by the second terminal, the fourth request being generated by means of the payment-free behavior by random default; and a first sending unit, configured to send the second image and a decryption key that is corresponding to the encryption policy to the second terminal, so that the second terminal decrypts the second image according to the decryption key, to obtain the requested first image; or the decryption unit is configured to: decrypt the second image by using the decryption key corresponding to the encryption policy, to obtain the first image, and send the first image to the second terminal; and the first image is a clear presentation form of an entire image obtained after an entire image layer covered on the image is removed after demasking processing.

This implementation of the present disclosure further provides a computer storage medium storing a computer program, the computer program being used for performing the information access control method.

The first terminal and the second terminal may be electronic devices such as PCs, or may be portable electronic devices such as PADs, tablet computers, or handheld computers, or may be intelligent mobile terminals such as mobile phones, and are not limited thereto. The servers may be formed by using a cluster system and are electronic devices that are integrated or separately disposed for implementing functions of units. The first terminal, the second terminal, and the server each include at least a database for storing data and a processor for data processing, or include a storage medium disposed in the server or an independently disposed storage medium.

When performing processing, the processor for data processing may be implemented as a microprocessor, a CPU, a DSP, or an FPGA. The storage medium includes an operation instruction. The operation instruction may be computer executable code. The operation instruction is used for performing the operations in the process of the information access control method in the foregoing implementations of the present disclosure.

Figure 5:
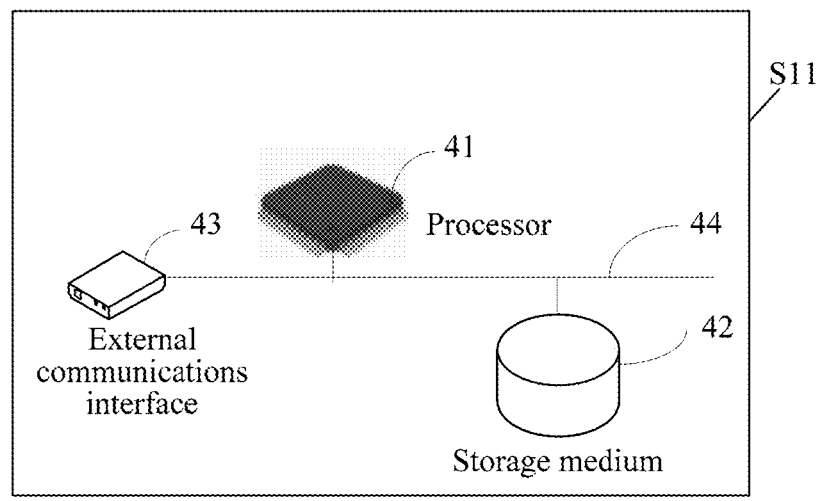
FIG. 5 is a schematic structural diagram of a composition according to some implementations of the present disclosure.

The first terminal, the second terminal, and the server are used as examples of hardware entities S11 and are shown in FIG. 5. The apparatus includes a processor 41, a storage medium 42, and at least one external communications interface 43. The processor 41, the storage medium 42, and the external communications interface 43 are connected by using a bus 44.

Figure 6:
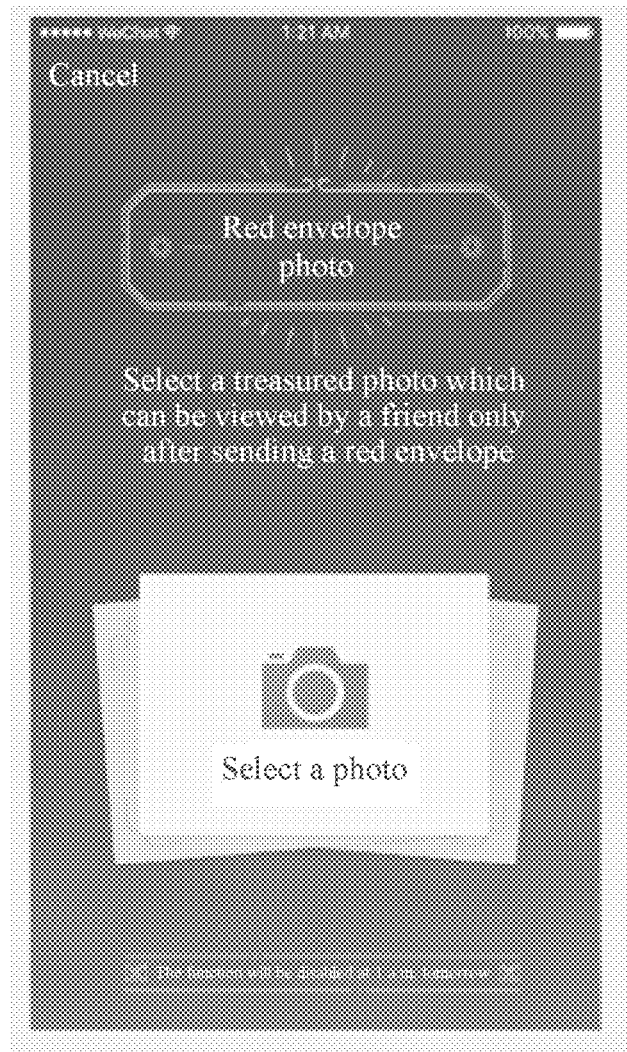
FIG. 6 to FIG. 19 are schematic diagrams of multiple application scenarios applying the implementations of the present disclosure.
Figure 7:
Figure 8:
Figure 9:
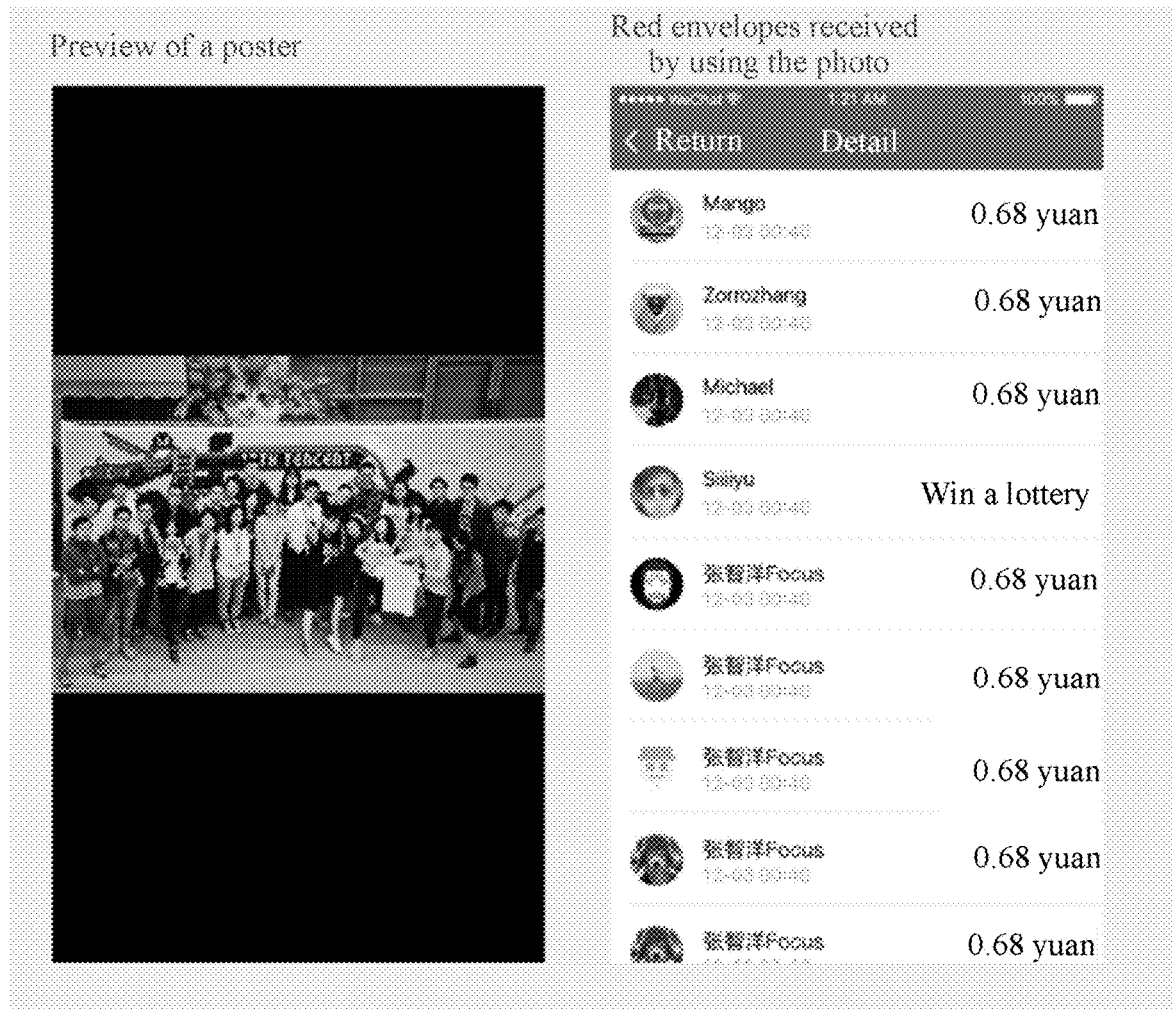
Figure 10:
Figure 11:
Figure 12:
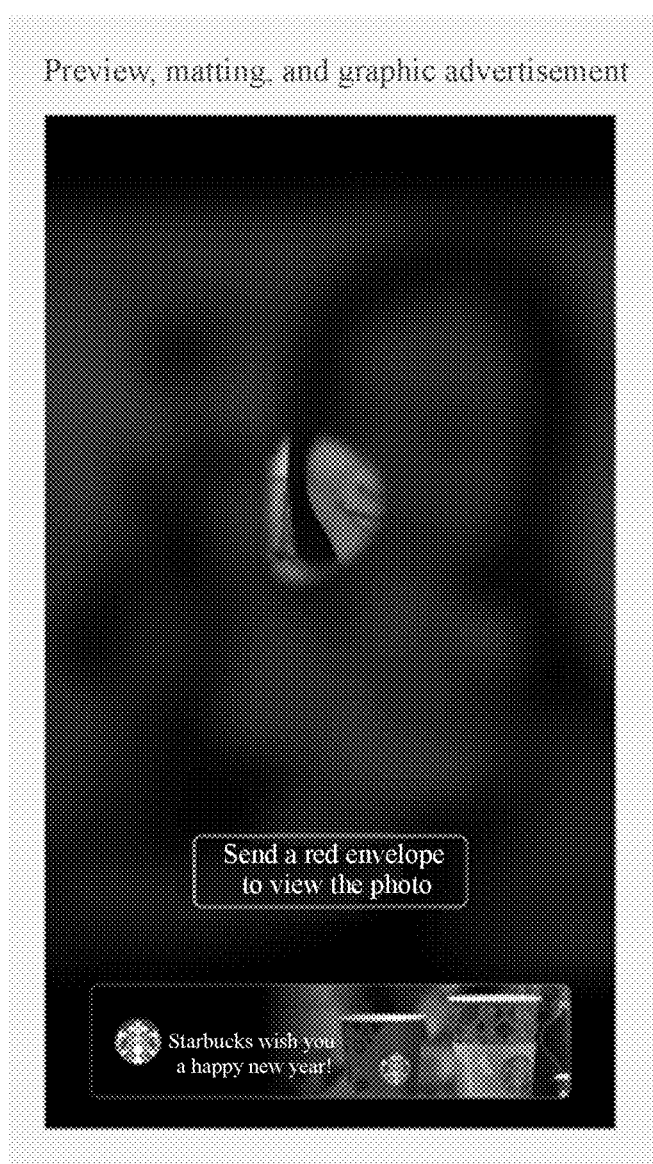
Figure 13:
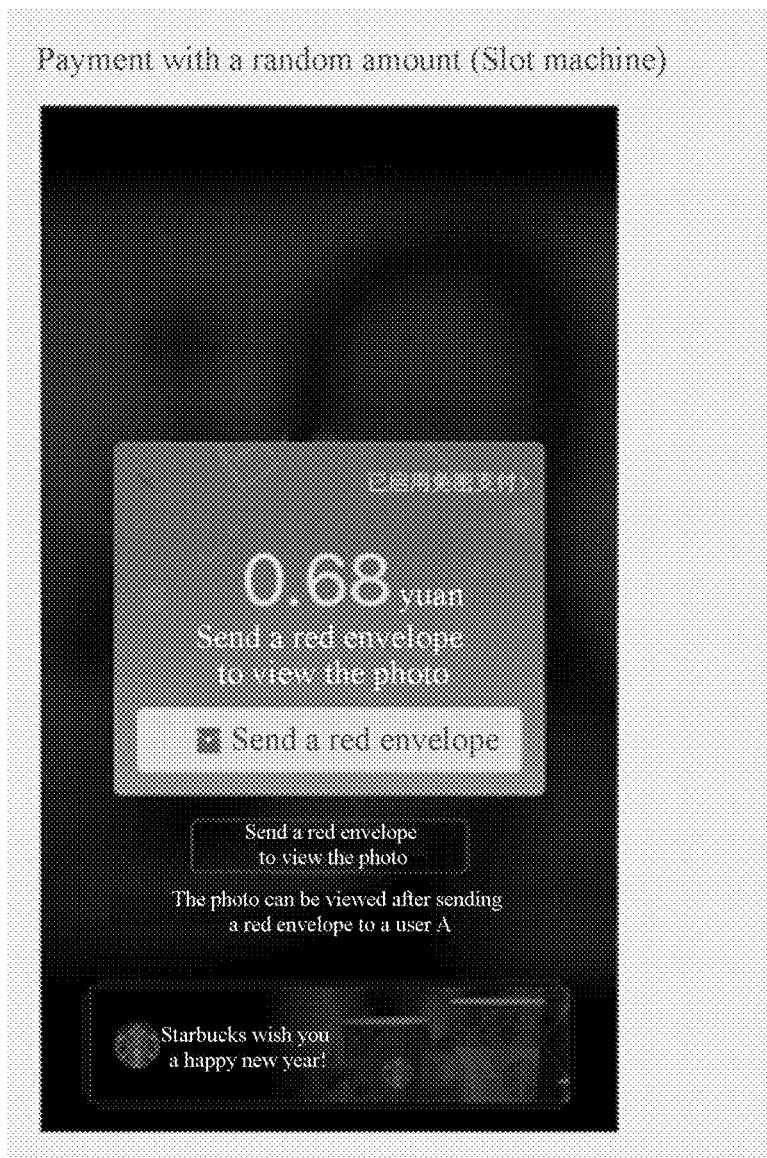
Figure 14:
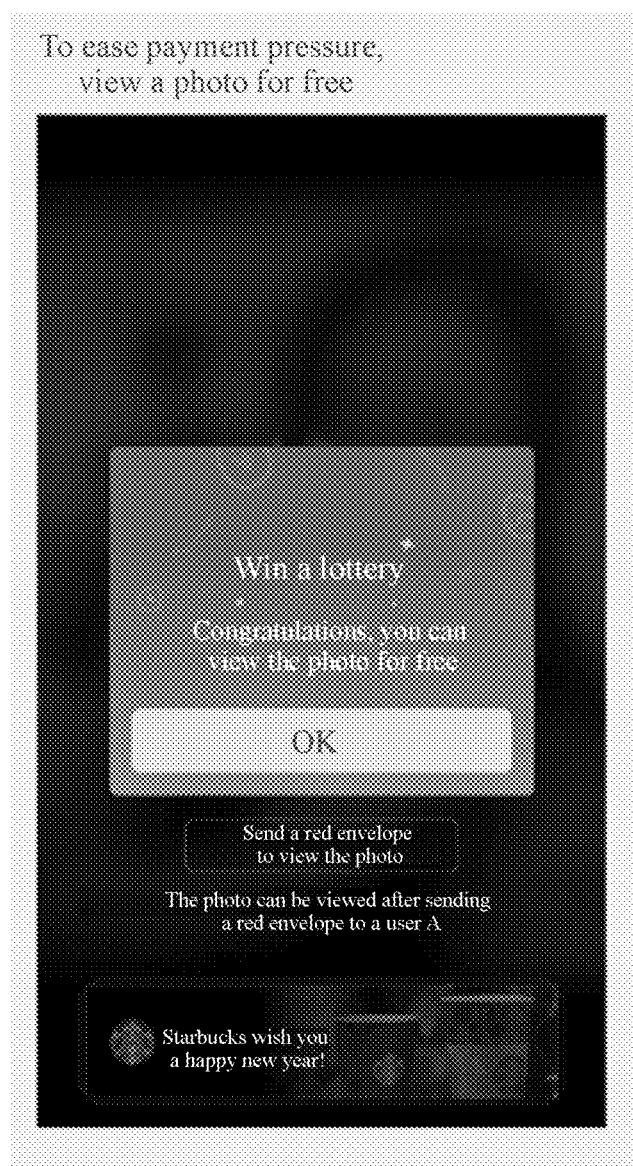
Figure 15:

The implementations of the present disclosure are described as follows by using an example of a real application scenario:

An implementation of the present disclosure applied to this application scenario is a technical solution of reducing meaningless content displayed on an image mask. Involved abbreviations and key term definitions include a red envelope photo, which is a new publishing type of WeChat moments. An image pulled by a user on a timeline is encrypted. The user can decrypt the image only after sending a red envelope to a publisher. Multiple application scenarios involved in the information exchange process of encryption and decryption are shown in FIG. 6 to FIG. 15. FIG. 6 to FIG. 9 are schematic diagrams of a user interface displayed on an application interface of a first terminal. FIG. 6 is a schematic diagram of uploading any first image. FIG. 7 is a schematic diagram of inputting text information corresponding to the any first image after the image is uploaded. FIG. 8 is a schematic diagram of publishing the image; in this case, the image is actually a second image obtained after the any first image uploaded by a user is encrypted. For example, the second image is covered by an image layer of a mask type, which may certainly be an image that is not of a mask type and that is obtained by means of another masking policy. The left side of FIG. 9 is a schematic diagram of reviewing the first image by the image publisher on a side of the first terminal. The right side of FIG. 9 is a schematic diagram of viewing statistics about received red envelopes by the image publisher on the side of the first terminal. FIG. 10 to FIG. 15 are schematic diagrams of a user interface displayed on an application interface of the first terminal. FIG. 10 is a schematic diagram of viewing the second image by an image receiver on a side of a second terminal. The image is actually a second image obtained after obtained after the any first image uploaded by a user is encrypted. The second image is covered by an image layer of a mask type, which may certainly be an image that is not of a mask type and that is obtained by means of another masking policy (as shown in FIG. 10, an image covered by an image layer is a final presentation result formed by a mask; the mask refers to a layer of ground glass covered on a clear image, and the layer of ground glass is referred to as an "image mask"). FIG. 11 is a schematic diagram of prompting a friend to send a red envelope to view a photo. FIG. 12 is a schematic diagram of viewing a clear image under an image layer by means of matting. FIG. 13 is a schematic diagram of sending a red envelope. FIG. 14 is a schematic diagram of viewing an image for free by means of winning a lottery. FIG. 15 is a schematic diagram of displaying envelopes sent by friends in moments.

Figure 16:
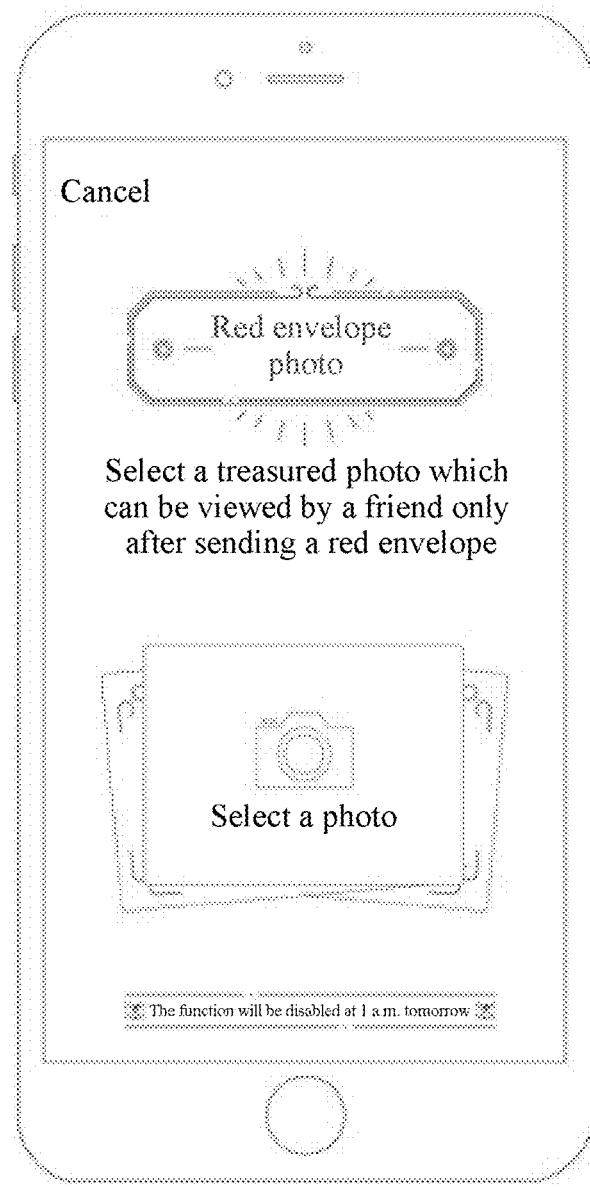
Figure 17:
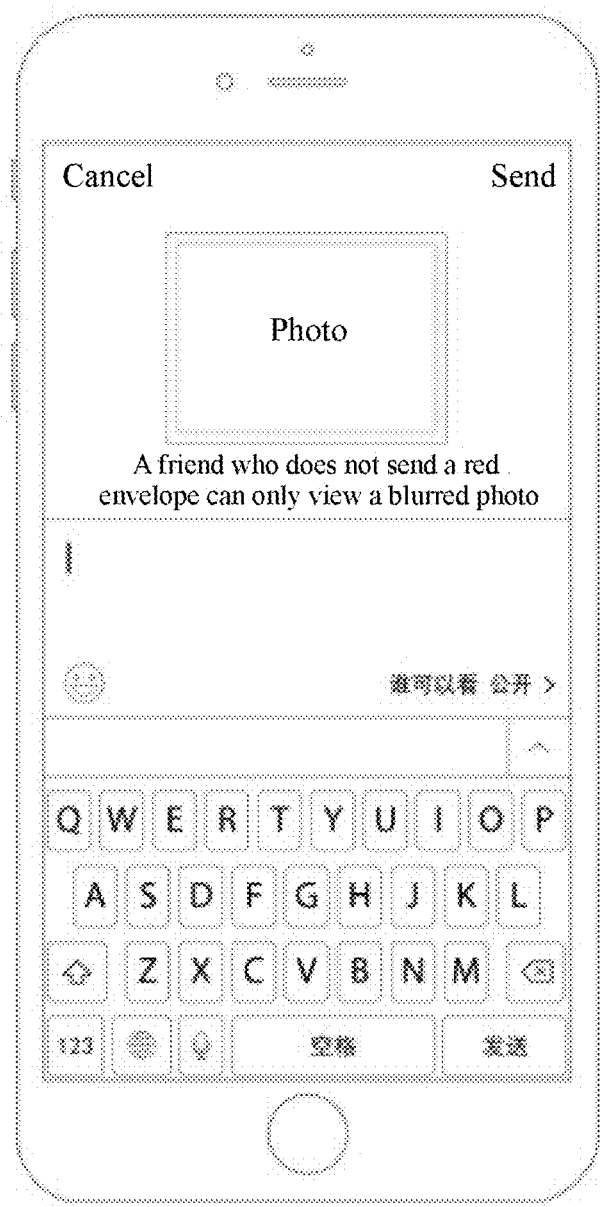
Figure 18:
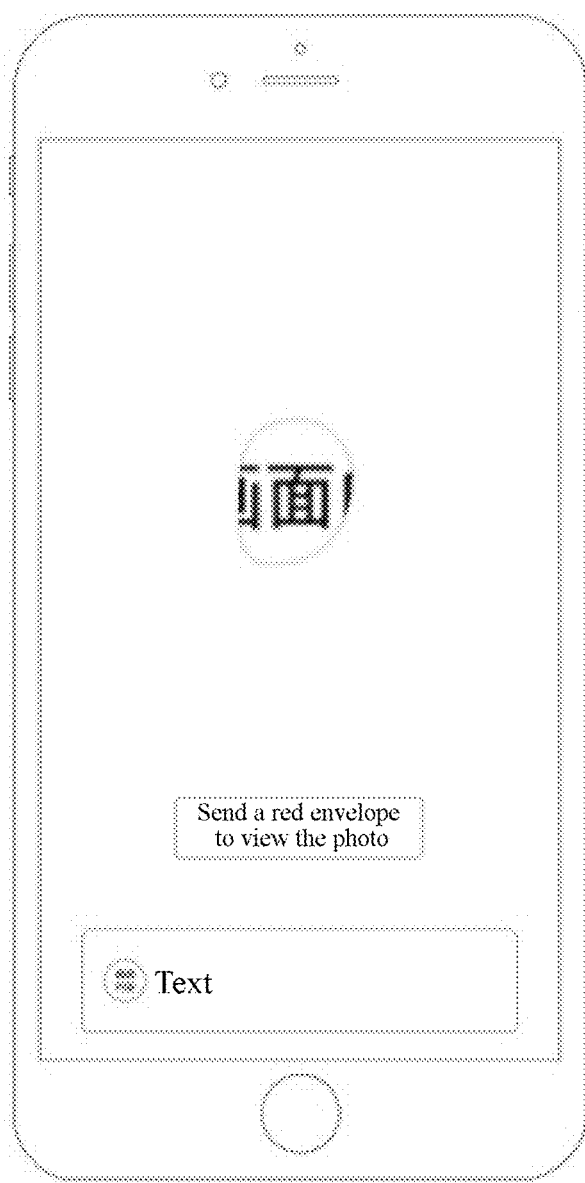
Figure 19:
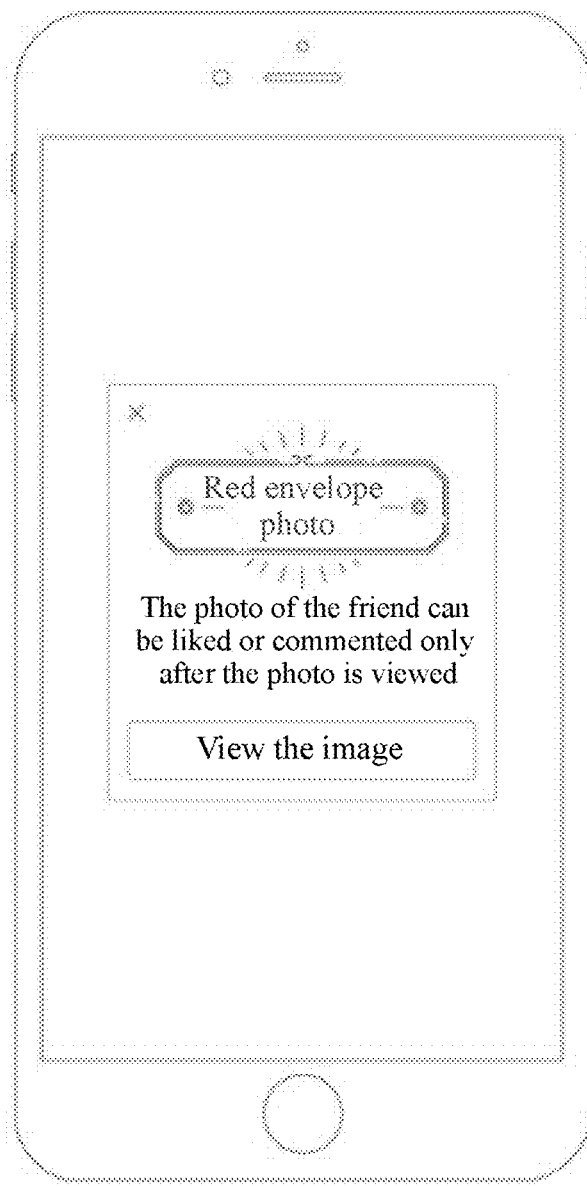

Through FIG. 16 to FIG. 19, a specific implementation process including a series of content such as how to send a red envelope photo, how to receive a red envelope photo, and removing a masking effect with reference to a process of encrypting and decrypting a photo is simply described according to the implementations of the present disclosure. The implementation process includes: selecting a first image on an information sending interface of the application, uploading the first image, and uploading any first image (as shown in FIG. 16); after uploading the any first image, inputting text information corresponding to the image (as shown in FIG. 17), and generating a first request according to the first image and the text information; sending the first request to a server, to request the server to perform encryption processing on the first image in the first request, so that a second image obtained after the encryption processing is displayed on an information presentation interface of an application running on a second terminal; the second image being a presentation form that is of covering an image layer on an image and that is rendered by means of a masking policy, the presentation form being different from a clear presentation form of another image on the information presentation interface of the application; obtaining, when viewing the image by using an image preview mode, at least one touch operation performed on different regions of the second image, and performing local demasking processing according to a preset policy, to obtain at least one piece of key information corresponding to the different regions of the image (as shown in FIG. 18); when it is determined, according to the at least one piece of key information, that an information form that is used for correspondingly decrypting the second image needs to be returned to the second terminal, sending a second request to the server according to a prompt described in FIG. 19 and indicating that a red envelope needs to be sent to view an original image; receiving second prompt information indicating that the image needs to be viewed by means of a payment behavior; obtaining a payment behavior generated by responding to the second prompt information, generating a third request according to the payment behavior, and sending the third request to the server, to request to perform decryption processing on the second image; and generating payment information according to the payment behavior, the second terminal instructing the server to send the payment information to a first terminal; or viewing the image by means of a payment-free behavior such as winning a lottery.

The technical solution is put forward for a condition that during actual application, when a user performs information exchange based on a social application (for example, a WeChat application), in a scenario in which a "red envelope photo" is published in moments, each time the user enters an image preview mode to view an image, the user can view a partial clear image through ground glass covered on a clear image. A clear part displayed each time when an image preview mode is entered is random. However, due to excessive randomness, the user does not know whether it is necessary to provide feedback. Because the clear part displayed each time when the image preview mode is entered is random, a meaningless part of an image is inevitably displayed. As a result, a requirement of the user for previewing an image and providing feedback for the image is reduced. According to the implementations of the present disclosure, in the scenario of the "red envelope photo", because of the function of publishing a "red envelope photo" newly added in moments, the user can only see a blurred thumbnail and a blurred image, and can see a partial clear image each time when an image preview mode is entered. Such a design is intended to enhance the impulse of the user to click to preview an image, and even to preview an image for multiple times, thereby achieving a substantial quantity of advertisement exposures on an image preview interface. A specific implementation is: an important information region of an image is anchored by using a face recognition interface provided by a system, and a probability of displaying meaningless content is reduced by means of policy distribution. To strategically display informative content of the image, the most informative region of the image is anchored by using the face recognition interface provided by the system, and the policy is displayed by means of a design. This can not only improve a click rate of an image previewed by users but also prevent image information of an image publisher from being completely displayed, without affecting positivity of the image publisher.

A specific implementation of the policy is: 1. An important information region of an image is anchored by using a face recognition interface provided by a system. 2. A display policy developed after the important information region of the image is anchored includes: (1) When there is no face in the image or a quantity of faces in the image is greater than or equal to 5, the key information is randomly displayed according to the display policy. (2) When there is a face in the image or a quantity of faces in the image is less than or equal to 5, a face is first selected randomly, a region M accounting for 60% of a lower part of the face is circled; a probability of displaying the region M is 10%, a probability of displaying a circumstance of the face is 40%, and a probability of displaying content of the image is 50%. 3. The display region is a circle, and a minimum radius and a maximum radius are controlled.

The specific implementation is applied to interaction for a publishing type of a "red envelope photo" in moments. Each time entering an image preview mode, a WeChat friend of a publisher can view a partial clear image. Therefore, the following two targets are achieved: (1) the impulse of the user to click to preview an image, and even to preview an image for multiple times is enhanced, thereby achieving a substantial quantity of advertisement exposures on an image preview interface. (2) Important information of image content of a "red envelope photo" publisher is prevented from being completely displayed, without affecting positivity of the publisher.

Beneficial effects of the implementations of the present disclosure are as follows: A "red envelope photo" scenario in moments bears an important advertisement exposure task; the impulse of the user to click to preview an image, and even to preview an image for multiple times is enhanced, thereby achieving a substantial quantity of advertisement exposures on an image preview interface; and important information of image content of a "red envelope photo" publisher is prevented from being completely displayed, without affecting positivity of the publisher.

In the several implementations provided in this application, it should be understood that the disclosed device and method may be implemented in other manners. The described device implementation is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented by using some interfaces. The indirect couplings or communication connections between the devices or units may be implemented in electronic, mechanical, or other forms.

The units described as separate parts may or may not be physically separate, and the parts displayed as units may or may not be physical units, that is, may be located in one position, or may be distributed on a plurality of network units. Some or all of the units may be selected to achieve the objectives of the solutions of the implementations according to actual needs.

In addition, the functional units in the implementations of the present disclosure may be integrated into one processing unit, or each of the units may exist alone physically, or two or more units may be integrated into one unit. The integrated units may be implemented in a form of hardware, or may be implemented in a form of a software functional unit.

Persons of ordinary skill in the art may understand that some or all of the operations in the method implementations may be implemented by a program instructing relevant hardware. The program may be stored in a non-transitory computer readable storage medium. When the program is executed, the operations in the method implementations are performed. The storage medium may be any medium that is capable of storing program code, such as a portable storage device, a read-only memory (ROM, Read-Only Memory), a random access memory (RAM, Random Access Memory), a magnetic disk, or an optical disk.

Alternatively, when the integrated unit in the present disclosure is implemented in the form of the software functional module and sold or used as a separate product, the integrated unit may be stored in a non-transitory computer readable storage medium. Based on such an understanding, the technical solutions of the implementations of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the operations of the methods described in the implementations of the present disclosure. The storage medium may be any medium that is capable of storing program code, such as a portable storage device, a ROM, a RAM, a magnetic disk, or an optical disk.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The information access control method in the implementations of the present disclosure includes: selecting a first image on an information sending interface of an application running on a terminal (for example, a first terminal as an image sending party), uploading the first image, and generating a first request according to the first image; sending the first request to a server, to request the server to perform encryption processing on the first image in the first request, so that a second image obtained after the encryption processing is displayed on an information presentation interface of an application running on a second terminal; the second image being a presentation form that is of covering an image layer on an image and that is rendered by means of a masking policy, the presentation form being different from a clear presentation form of another image on the information presentation interface of the application; and receiving payment information returned by the second terminal, the payment information being generated by the second terminal by responding to information on the information presentation interface, and the payment information being used for obtaining, after decryption, a clear presentation form of an image whose image layer has been removed. According to the implementations of the present disclosure, whether it is necessary to return an extra information form for a blurred image can be accurately determined, thereby avoiding meaningless information interaction, reducing processing costs, improving efficiency, and alleviating congestion in a network environment.

What is claimed is:

1. An information access control method performed at a computer server having one or more processors and memory storing one or more programs to be executed by the one or more processors, the method comprising:
   receiving an image sharing request from a first terminal, wherein the first terminal is associated with a first user account of a social networking application and the image sharing request includes a first image to be shared among a user group of the social networking application of which the first user account is a member;
   identifying a plurality of faces in the first image through face recognition;
   randomly selecting one of the plurality of identified faces in the first image;
   applying a mask to the first image except a predefined portion of the randomly-selected face;
   sending the partially masked first image to a second terminal, wherein the second terminal is associated with a second user account of the social networking application that is also a member of the user group;
   receiving an image viewing request from the second terminal, wherein the image viewing request is generated by the second terminal in response to a user selection of the partially masked first image at the second terminal and a user-initiated resource transfer from the second user account to the first user account; and
   returning a version of the first image not being partially masked to the second terminal.

2. The method according to claim 1, further comprising:
   encrypting the first image using an encryption key to obtain a second image that is an encrypted version of the first image; and
   returning the second image and a decryption key to the second terminal, wherein the second terminal is configured to restore the first image from the second image using the decryption key.

3. The method according to claim 2, wherein the encryption key is the same as the decryption key.

4. The method according to claim 2, wherein the restored first image has an associated expiration timestamp after which the restored first image is replaced by the partially masked first image at the second terminal.

5. The method according to claim 4, wherein the expiration timestamp of the restored first image is dependent upon the user-initiated resource transfer from the second user account to the first user account.

6. The method according to claim 1, wherein the image sharing request from the first terminal further includes a text message and the text message is sent to the second terminal along with the preview version of the first image.

7. The method according to claim 1, wherein the applying a mask to the first image except a predefined portion of the randomly-selected face further comprises:
   defining a distribution region of the first image including the randomly-selected face and a neighboring region that is within a predefined distance from the randomly-selected face; and
   generating a low-resolution preview version of the first image not including the distribution region as the partially masked first image.

8. The method according to claim 7, wherein the distribution region of the first image further includes a randomly-selected portion of the first image outside the plurality of identified faces in the first image.

9. The method according to claim 1, wherein the mask comprises at least one of the following: blurring processing, direct blackout, and voiding.

10. A computer server, comprising:
    one or more processors;
    memory; and
    one or more programs stored in the memory, wherein the one or more programs, when executed by the one or more processors, cause the computer server to perform a plurality of operations including:
      receiving an image sharing request from a first terminal, wherein the first terminal is associated with a first user account of a social networking application and the image sharing request includes a first image to be shared among a user group of the social networking application of which the first user account is a member;
      identifying a plurality of faces in the first image through face recognition;
      randomly selecting one of the plurality of identified faces in the first image;
      applying a mask to the first image except a predefined portion of the randomly-selected face;
      sending the partially masked first image to a second terminal, wherein the second terminal is associated with a second user account of the social networking application that is also a member of the user group;
      receiving an image viewing request from the second terminal, wherein the image viewing request is generated by the second terminal in response to a user selection of the partially masked first image at the second terminal and a user-initiated resource transfer from the second user account to the first user account; and
      returning a version of the first image not being partially masked to the second terminal.

11. The computer server according to claim 10, wherein the plurality of operations further comprise:
    encrypting the first image using an encryption key to obtain a second image that is an encrypted version of the first image; and
    returning the second image and a decryption key to the second terminal, wherein the second terminal is configured to restore the first image from the second image using the decryption key.

12. The computer server according to claim 11, wherein the encryption key is the same as the decryption key.

13. The computer server according to claim 11, wherein the restored first image has an associated expiration timestamp after which the restored first image is replaced by the partially masked first image at the second terminal.

14. The computer server according to claim 13, wherein the expiration timestamp of the restored first image is dependent upon the user-initiated resource transfer from the second user account to the first user account.

15. The computer server according to claim 10, wherein the image sharing request from the first terminal further includes a text message and the text message is sent to the second terminal along with the preview version of the first image.

16. The computer server according to claim 10, wherein the operation of applying a mask to the first image except a predefined portion of the randomly-selected face further comprises:
    defining a distribution region of the first image including the randomly-selected face and a neighboring region that is within a predefined distance from the randomly-selected face; and
    generating a low-resolution preview version of the first image not including the distribution region as the partially masked first image.

17. The computer server according to claim 16, wherein the distribution region of the first image further includes a randomly-selected portion of the first image outside the plurality of identified faces in the first image.

18. A non-transitory computer readable storage medium storing a plurality of computer executable instructions, wherein the plurality of computer executable instructions, when executed by one or more processors of a computer server, cause the computer server to perform a plurality of operations including:
    receiving an image sharing request from a first terminal, wherein the first terminal is associated with a first user account of a social networking application and the image sharing request includes a first image to be shared among a user group of the social networking application of which the first user account is a member;
    identifying a plurality of faces in the first image through face recognition;
    randomly selecting one of the plurality of identified faces in the first image;
    applying a mask to the first image except a predefined portion of the randomly-selected face;
    sending the partially masked first image to a second terminal, wherein the second terminal is associated with a second user account of the social networking application that is also a member of the user group;
    receiving an image viewing request from the second terminal, wherein the image viewing request is generated by the second terminal in response to a user selection of the partially masked first image at the second terminal and a user-initiated resource transfer from the second user account to the first user account; and
    returning a version of the first image not being partially masked to the second terminal.

19. The non-transitory computer readable storage medium according to claim 18, wherein the plurality of operations further comprise:
    encrypting the first image using an encryption key to obtain a second image that is an encrypted version of the first image; and
    returning the second image and a decryption key to the second terminal, wherein the second terminal is configured to restore the first image from the second image using the decryption key.

20. The non-transitory computer readable storage medium according to claim 19, wherein the restored first image has an associated expiration timestamp after which the restored first image is replaced by the partially masked first image at the second terminal.

* * * * *